US010212308B2

(12) United States Patent
Nakagawa

(10) Patent No.: US 10,212,308 B2
(45) Date of Patent: Feb. 19, 2019

(54) INFORMATION PROCESSING SYSTEM, IMAGE FORMING APPARATUS, METHOD OF CONTROLLING THE SAME, AND STORAGE MEDIUM

(71) Applicant: CANON KABUSHIKI KAISHA, Tokyo (JP)

(72) Inventor: Kaori Nakagawa, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/898,294

(22) Filed: Feb. 16, 2018

(65) Prior Publication Data

US 2018/0249039 A1 Aug. 30, 2018

(30) Foreign Application Priority Data

Feb. 27, 2017 (JP) .................................. 2017-035110

(51) Int. Cl.
*H04N 1/04* (2006.01)
*H04N 1/333* (2006.01)
*H04N 1/00* (2006.01)

(52) U.S. Cl.
CPC ..... *H04N 1/33376* (2013.01); *H04N 1/00217* (2013.01); *H04N 1/00244* (2013.01); *H04N 1/00302* (2013.01)

(58) Field of Classification Search
CPC .......... H04N 1/33376; H04N 1/00244; H04N 1/00217; H04N 1/00302
USPC ....................................................... 358/1.15
See application file for complete search history.

(56) References Cited

U.S. PATENT DOCUMENTS 8,976,402 B2   3/2015 Nakamura
2016/0309055 A1* 10/2016 Naito ................. H04N 1/33346

FOREIGN PATENT DOCUMENTS

JP            2015032224 A    2/2015

* cited by examiner

*Primary Examiner* — Houshang Safaipour
(74) *Attorney, Agent, or Firm* — Rossi, Kimms & McDowell LLP

(57) ABSTRACT

An information processing system in which an image forming apparatus and an information processing apparatus are connected and in which remote support of the image forming apparatus is performed from the information processing apparatus. The image forming apparatus connects to a telephone network to perform a call with the information processing apparatus, determines whether or not the call is by a predetermined connection, and, upon determining that the call is by the predetermined connection, switches communication with the information processing apparatus to a call in accordance with HTTP media.

12 Claims, 7 Drawing Sheets

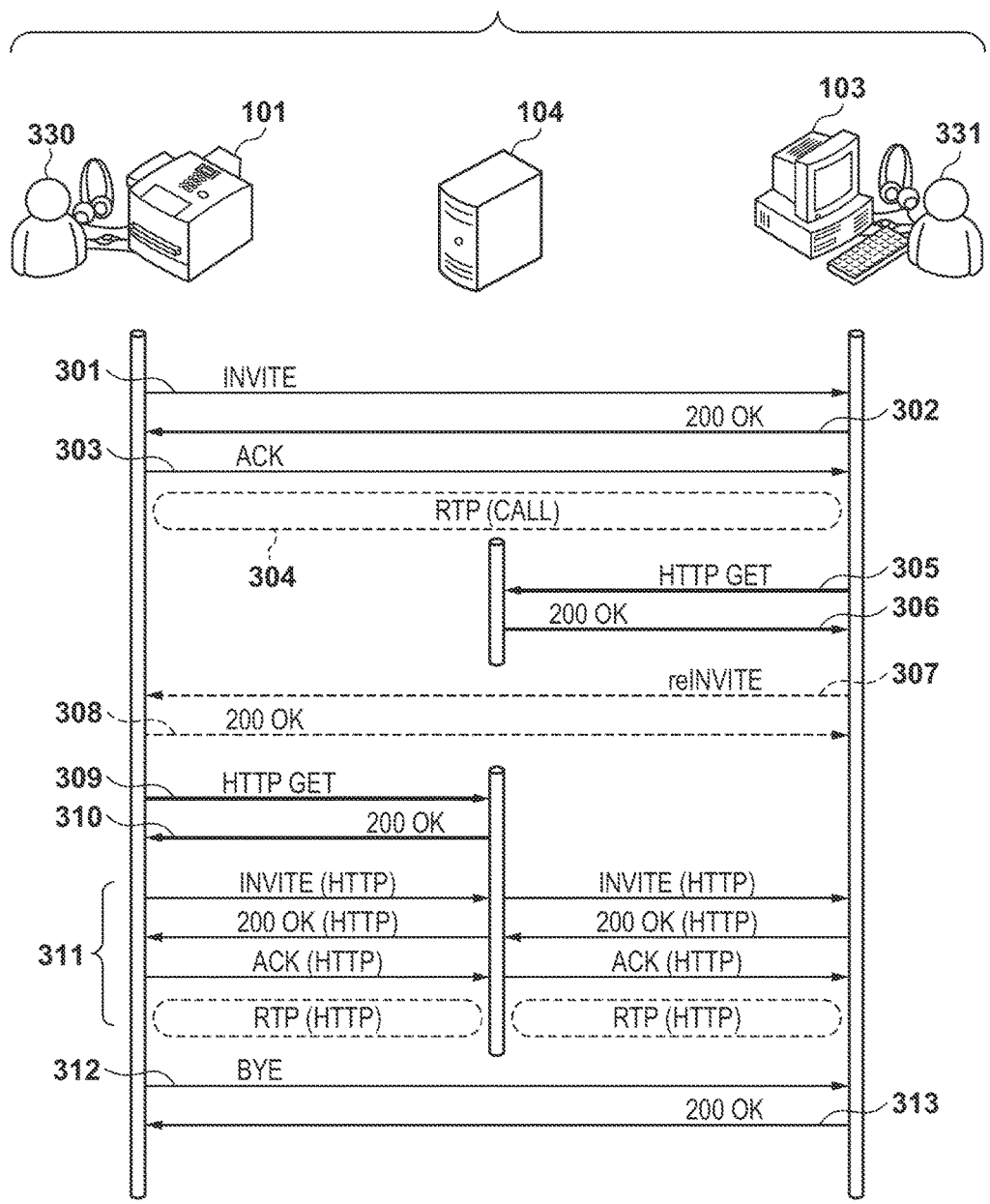

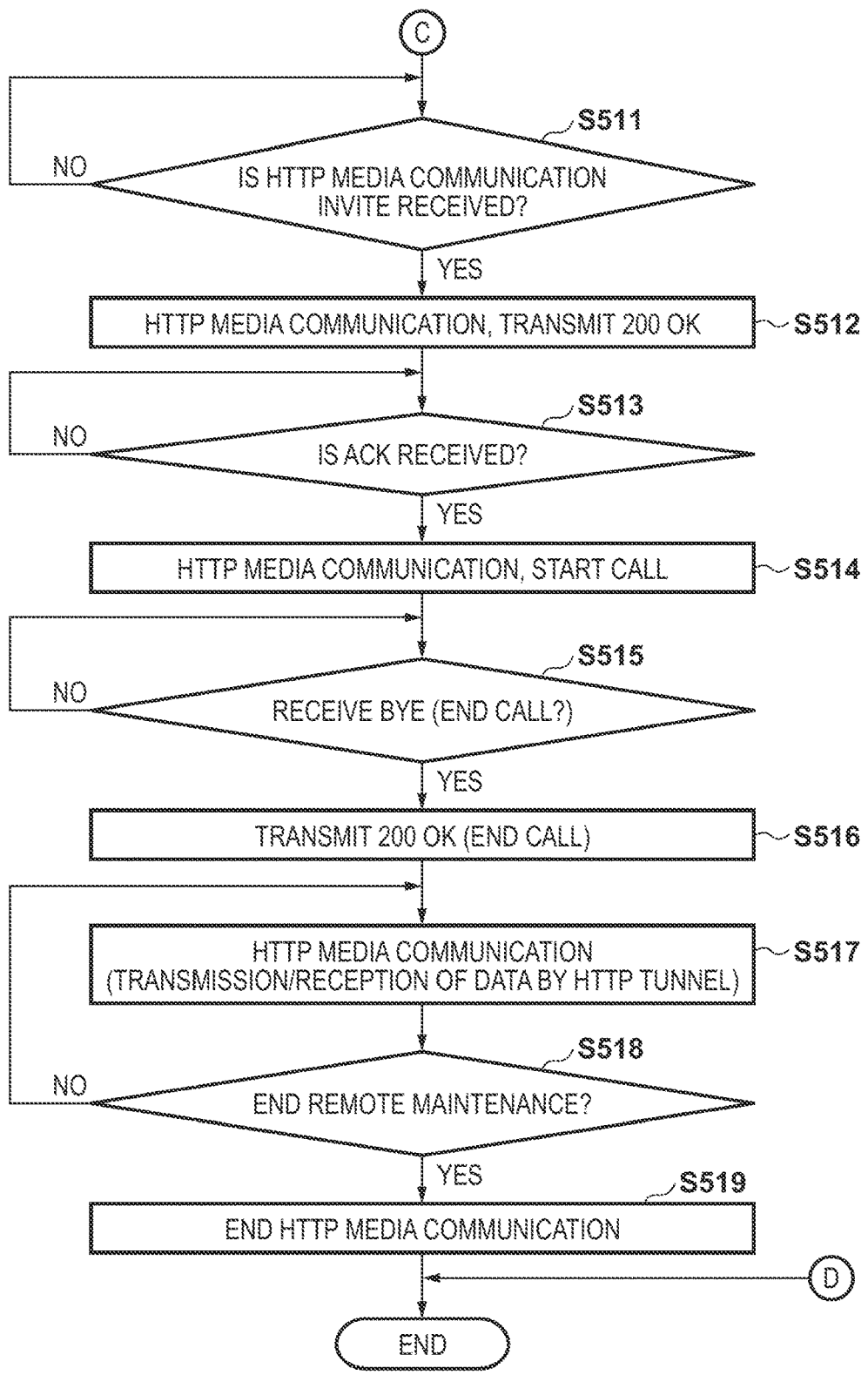

INFORMATION PROCESSING SYSTEM, IMAGE FORMING APPARATUS, METHOD OF CONTROLLING THE SAME, AND STORAGE MEDIUM

BACKGROUND OF THE INVENTION

Field of the Invention

The present invention relates to an information processing system, an image forming apparatus, a method of controlling the same, and a storage medium.

Description of the Related Art

As methods of using a product and procedures for troubleshooting become more complicated, users of the product are frequently asking questions to a call center of a manufacturer directly to get answers relating to trouble. Even in a multi-function peripheral that incorporates functions such as copy/print/FAX, a remote support service in accordance with audio or moving image communication and remote operation has been proposed in order to appropriately and quickly carry out procedures for troubleshooting. By this remote support service, it is possible to perform procedures necessary to investigate the cause of trouble by using a remote operation or convey a usage method by using audio or moving image communication, without a service person going to a site in order to solve the trouble.

In a multi-function peripheral for performing such remote support service, it is efficient to realize a connection to a call center by using a communication function of the multi-function peripheral and without using an apparatus that is not the multi-function peripheral such as a telephone or a PC.

Typically, there are many cases where it is difficult for a multi-function peripheral and a PC of a call center to establish a session directly, due to firewalls installed in offices. Accordingly, a technique for establishing a session between information terminals by using HTTP (Hyper Text Transfer Protocol) which has high compatibility with firewalls has been proposed. Typically, a connection from the Internet with respect to an information terminal blocked by a firewall is restricted. In contrast, a connection to the Internet from an information terminal behind the firewall is permitted in the case of HTTP which has high compatibility with the firewall.

Japanese Patent Laid-Open No. 2015-32224 proposes that two information terminals blocked by a firewall each connect to a relay server that can be connected to as an HTTP client, to establish a session between the information terminals and perform communication. In such a system, an identifier for associating communication between a multi-function peripheral and a call center in a relay server is necessary. Accordingly, the relay server issues a serial number which is an identifier to whichever of the multi-function peripheral and the call center that connected first. If the one that connected first is the call center, the operator of the call center conveys the serial number to a user of the multi-function peripheral by an audio call, and the user of the multi-function peripheral manually inputs the serial number from an operation unit of the multi-function peripheral so that remote maintenance is started. In addition, in the remote support service, between the user of the multi-function peripheral and the operator of the call center, an audio call is used as a means for performing communication during the remote maintenance or an information transfer when trouble occurs.

A billed call charge arises in the case of an audio call by telephone by a public switched telephone network, but in the case of a call by an extension telephone installed in a network connected by an intranet, a dedicated line, or the like, a billing does not happen and a call charge does not arise as the public switched telephone network is not passed through. In recent years, due to the spread of the Internet, intranets, and the like, IP telephones that use protocols such as SIP (Session Initiation Protocol) or RTP (Real-time Transfer Protocol) are widely used on an intranet or an NGN (NTT's public IP telephone network).

A user first queries a call center by telephone when a usage method of a multi-function peripheral is unclear or when trouble occurs and the user themself cannot resolve it. An operator of the call center connects a PC of the call center and the multi-function peripheral via a relay server and starts remote maintenance upon determining from information elicited from the user that remote maintenance is necessary. In such a case, the operator of the call center proceeds with the remote maintenance while, as necessary, making an audio call to convey and confirm setting/operation methods. In this manner, an audio call is one communication means for a user to perform communication with an operator during remote maintenance that they are unfamiliar with, and it is desirable for calls to be possible at any time as necessary.

However, call charges do not arise in a case where a call during the remote maintenance between a user of a multi-function peripheral and the operator of the call center can use an extension telephone within an intranet or a telephone that uses a dedicated line or an Internet line. However, in a case where a call passes through a public switched telephone network, a call charge in accordance with the amount of time of the call is incurred. Accordingly, there is a problem in that the cost of call charges becomes large in a case where a long time is necessary for remote maintenance.

Accordingly, switching from a public switched telephone network to a call via an extension telephone, a dedicated line, or an Internet call is desirable. However, manually performing a switch of a line is cumbersome for an operator or a user of a multi-function peripheral.

SUMMARY OF THE INVENTION

An aspect of the present invention is to eliminate the above-mentioned problem with conventional technology.

A feature of the present invention is to provide a technique for, in a case of performing remote maintenance between an image forming apparatus and an information processing apparatus, switching a line used without burdening an operator or a user of a multi-function peripheral.

According to a first aspect of the present invention, there is provided an information processing system in which an image forming apparatus and an information processing apparatus are connected, and in which remote support of the image forming apparatus is performed from the information processing apparatus, wherein the image forming apparatus comprises: a first memory device that stores a set of instructions; and at least one first processor that executes the instructions to: connect to a telephone network and make a call to the information processing apparatus, determine whether or not the call is by a predetermined connection, and switch communication with the information processing apparatus to a call in accordance with HTTP media, in accordance with having determined that the call is by the predetermined connection, and wherein the information processing apparatus comprises: a second memory device that stores a set of instructions; and at least one second processor that executes the instructions to: connect to the telephone network and make a call to the image forming apparatus, and perform a call in accordance with HTTP media with the image forming apparatus.

According to a second aspect of the present invention, there is provided an image forming apparatus capable of performing remote support from an information processing apparatus, a memory device that stores a set of instructions; and at least one processor that executes the instructions to: connect to a telephone network and make a call to the information processing apparatus, determine whether or not the call is by a predetermined connection, and switch communication with the information processing apparatus to a call in accordance with HTTP media, in accordance with having determined that the call is by the predetermined connection.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a sequence diagram for describing a sequence for a PC of the call center and the image forming apparatus according to the embodiment to perform communication via the relay server.

FIGS. 5A and 5B are flowcharts for describing processing for the PC of the call center according to the embodiment to make an HTTP connection with the image forming apparatus via the relay server.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
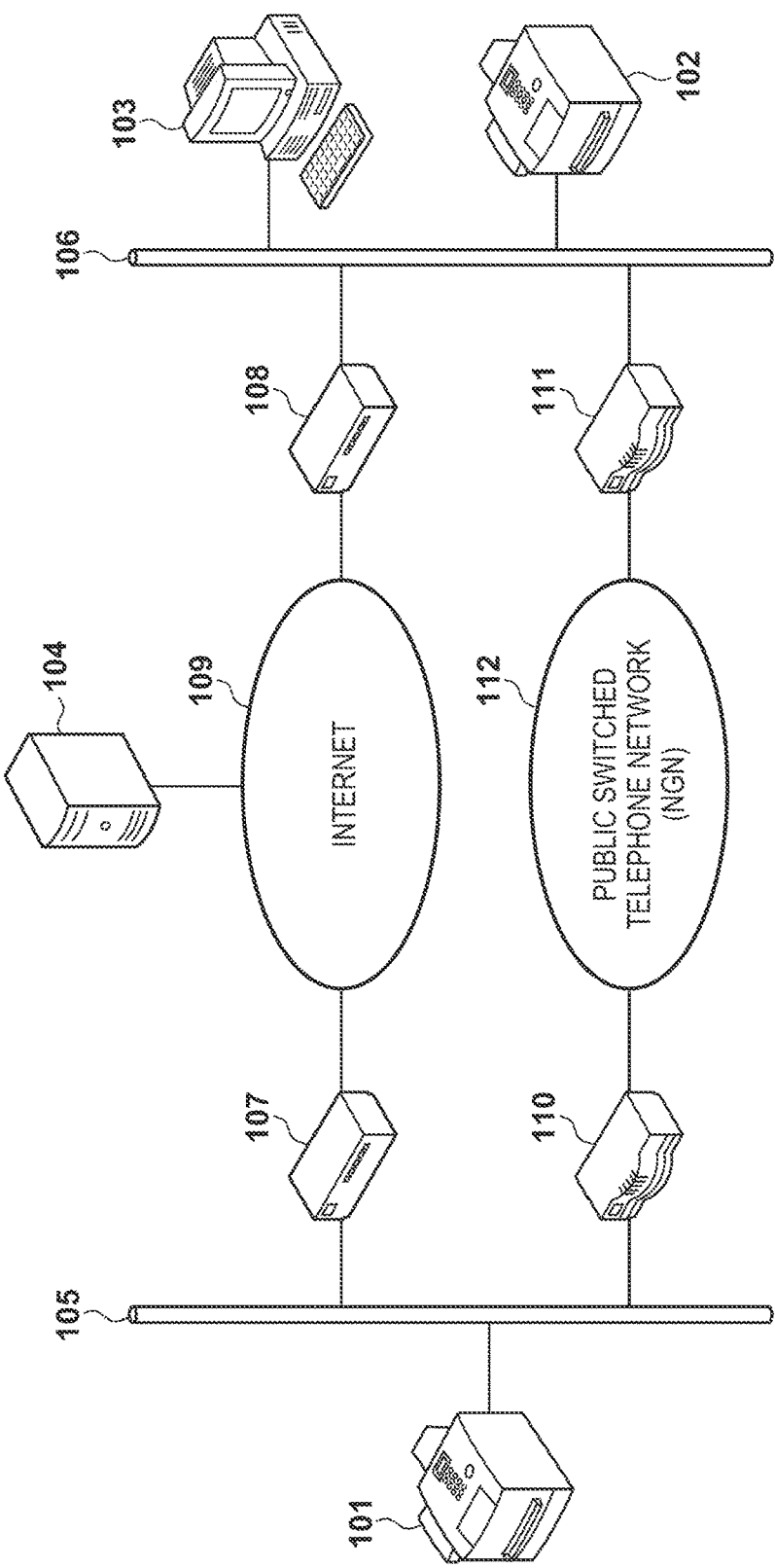
FIG. 1 depicts a view for describing a configuration of a remote support system according to an embodiment of the present invention.

FIG. 1 depicts a view for describing a configuration of a remote support system (an information processing system) according to an embodiment of the present invention.

The remote support system includes image forming apparatuses 101 and 102, a PC 103 that is an information processing apparatus operated by an operator, and an HTTP relay server 104. The image forming apparatuses 101 and 102 and the PC 103 operate as mutual communication partners, as apparatuses to which the present embodiment is applied. The PC 103 is set in a call center, and is operated by an operator of the call center.

The image forming apparatuses 101 and 102 and the PC 103 are provided with a data communication function for performing a data communication by executing call control by HTTP. The image forming apparatus 101 is connected to the Internet 109 via a network 105 and a firewall (FW) 107. The PC 103 which is on a call center side is connected to the Internet 109 via a FW 108 and a network 106. The image forming apparatus 102 is set in an intranet of the call center side, and is a similar apparatus to the image forming apparatus 101. In addition, an HTTP relay server 104 is connected to the Internet 109.

In data communication by HTTP, client nodes perform data communication with each other by performing POST/GET requests to a URI (Uniform Resource Identifier) provided from the HTTP relay server 104. Accordingly, the client nodes can perform data communication with each other without being blocked by a private address area or an FW.

In addition, the image forming apparatus 101 and the PC 103 are provided with an audio communication function for performing an audio call by using an audio input/output device such as a handset or a headset and executing SIP call control or a RTP protocol. In addition, the image forming apparatus 101 is connected to a public switched telephone network (NGN: Next Generation Network) 112 via the network 105 and a home gateway (HGW) 110. The PC 103 which is on the call center side is connected to the public telephone network 112 via an HGW 111 and the network 106. The public telephone network 112 is a public IP network that uses an internet protocol (IP) technique capable of communication that blends a telephone call, data communication, and a streaming broadcast.

Figure 2:
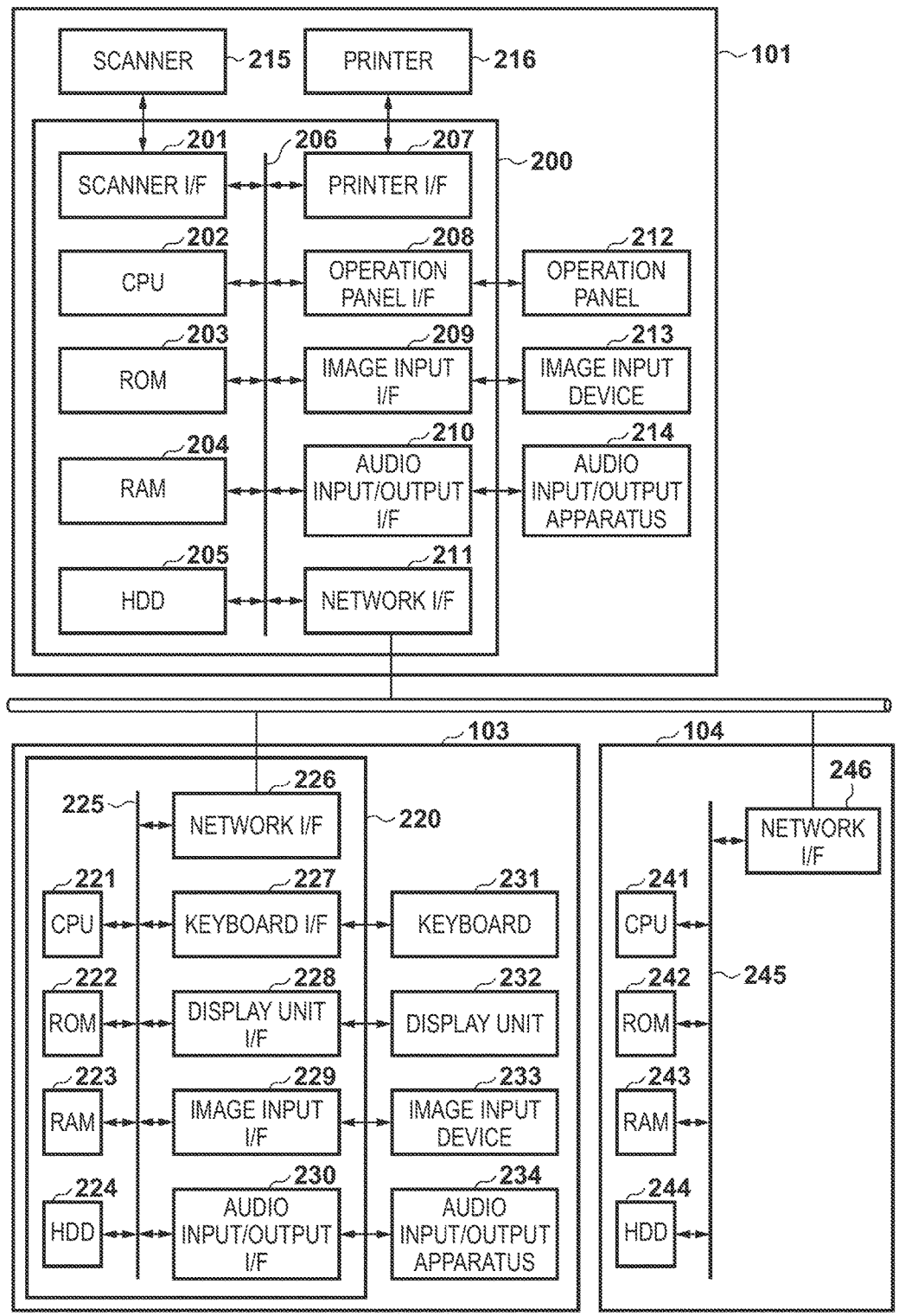
FIG. 2 is a block diagram for describing a hardware configuration of a relay server, a PC, and an image forming apparatus of the remote support system according to the embodiment.

FIG. 2 is a block diagram for describing a hardware configuration of the relay server 104, the PC 103, and the image forming apparatus 101 of the remote support system according to the embodiment.

The image forming apparatus 101 is provided with a control unit 200, an operation panel 212, an image input device 213, an audio input/output device 214, a scanner 215, and a printer 216. The control unit 200 is provided with a scanner I/F 201, a CPU 202, a ROM 203, a RAM 204, an HDD 205, a printer I/F 207, an operation panel I/F 208, an image input I/F 209, an audio input/output I/F 210, and a network I/F 211. These devices are connected to each other via a system bus 206, and can transmit/receive data via the system bus 206.

The CPU 202 executes a boot program recorded in the ROM 203 to deploy a control program recorded in the hard disk (HDD) 205 to the RAM 204. The CPU 202 executes the deployed program to comprehensively control the various devices connected to the system bus 206. The ROM 203 stores various data and the boot program executed by the CPU 202. The RAM 204 mainly functions as a main memory, a work area, or the like, of the CPU 202, and is configured such that a memory capacity can be extended by option RAM connected to an expansion port (not shown). The hard disk (HDD) 205 stores a control program, various application programs, font data, user files, edit files, and the like. Note that the HDD 205 is used in the embodiment as a storage device, but configuration may be taken to use, other than the HDD 205, an SD card, a flash memory, or the like as an external storage apparatus.

The scanner I/F 201 controls input of image data from the scanner 215. The printer I/F 207 controls output of image data to the printer 216. The operation panel I/F 208 performs display control for the operation panel 212, and controls input of various setting information inputted from the operation panel 212. The image input I/F 209 controls input of images from an image input device 213 which is a camera or the like. The audio input/output I/F 210 controls audio input/output with respect to the audio input/output device 214 which is a handset, a headset, or the like. The network I/F 211 performs data communication with an external network through a network cable.

The PC 103 is provided with a control unit 220, a keyboard 231, a display unit 232, an image input device 233, and an audio input/output device 234. The control unit 220 is provided with a CPU 221, a ROM 222, a RAM 223, an HDD 224, a network I/F 226, a keyboard I/F 227, a display unit I/F 228, an image input I/F 229, and an audio input/output I/F 230.

The CPU 221 executes a boot program stored in the ROM 222 to deploy a control program stored in the hard disk (HDD) 224 to the RAM 223, and then executes the deployed program. In accordance with the program, the various devices connected to a system bus 225 are comprehensively controlled. The ROM 222 stores various data and the boot program executed by the CPU 221. The RAM 223 mainly functions as a main memory of the CPU 221, as a work area and the like, and memory capacity can be expanded by an option RAM connected to an expansion port (not shown). The hard disk (HDD) 224 stores a control program, various application programs, font data, user files, edit files, and the like. Note that the HDD 224 is used in the embodiment as a storage medium for the program, but configuration may be taken to use, other than the HDD 224, an SD card, a flash memory, or the like as external storage.

The network I/F 226 performs data communication with a device connected to the network through a network cable. The keyboard I/F 227 controls a key input from a pointing device (not shown) or the keyboard 231. The display unit I/F 228 controls displaying with respect to the display unit 232. The image input I/F 229 controls input of image data from the image input device 233 which is a camera or the like. The audio input/output I/F 230 controls audio input/output with respect to the audio input/output device 234 which is a handset, a headset, or the like.

The HTTP relay server 104 is provided with a CPU 241, a ROM 242, a RAM 243, an HDD 244, and a network I/F 246. The CPU 241 executes a boot program recorded in the ROM 242 to deploy a control program recorded in the hard disk (HDD) 244 to the RAM 243. The CPU 241 executes the deployed program to comprehensively control the various devices connected to a system bus 245. The ROM 242 stores various data and the boot program executed by the CPU 241. The RAM 243 mainly functions as a main memory of the CPU 241, as a work area and the like, and memory capacity can be expanded by an option RAM connected to an expansion port (not shown). The hard disk (HDD) 244 stores a control program, various applications, font data, user files, and edit files. Note that the HDD 244 is used in this embodiment as a storage medium for a program, but configuration may be taken to use, other than the HDD 244, an SD card, a flash memory, or the like as an external storage apparatus. The network I/F 246 performs data communication with an external network through a network cable.

FIG. 3 is a sequence diagram for describing a sequence for the PC 103 of the call center and the image forming apparatus 101 according to the embodiment to perform communication via the relay server 104. This shows a situation where, after the image forming apparatus 101 and the PC 103 have started a call connection in accordance with SIP and have entered a call state, a connection in accordance with an HTTP tunnel is made via the relay server 104, and a switch is made from the call in accordance with SIP to a call in accordance with HTTP media communication.

A user 330 of the image forming apparatus 101 uses the audio input/output device 214 which is a handset, a headset, or the like connected to the image forming apparatus 101 to make an IP telephone call to the call center. Accordingly, the image forming apparatus 101, at reference numeral 301, sends an INVITE which is a request to establish a session to the call center. When the INVITE is received at the PC 103 and the operator 331 responds by an IP telephone application which is a part of a remote maintenance system installed in the PC 103, 200 OK is returned at reference numeral 302. Accordingly, the image forming apparatus 101 returns an ACK with respect to the 200 OK at reference numeral 303. Accordingly, at reference numeral 304, a session in accordance with SIP is established between the image forming apparatus 101 and the PC 103, and a call state is entered.

During the call, call processing is performed in accordance with using a VoIP (Voice over Internet Protocol) technique to variously encode/compress audio to convert it to IP packets, and transfer the IP packets to the public telephone network 112 in real-time by using RTP. When it is determined that remote maintenance is necessary in the call between the user 330 of the image forming apparatus 101 and the operator 331 of the call center, the operator 331 makes an HTTP connection to the relay server 104 at reference numeral 305. At reference numeral 306, the PC 103 obtains the address of the relay server 104, and a serial number which is an identifier associated with an HTTP connection from the image forming apparatus 101 via the relay server 104.

Next, at reference numeral 307, the PC 103 transmits the obtained address of the relay server 104 and the serial number by a reINVITE to the image forming apparatus 101. Consequently, the image forming apparatus 101, upon obtaining the address of the relay server 104 and the serial number from the received reINVITE, returns 200 OK to the PC 103 at reference numeral 308.

Next, at reference numeral 309 the image forming apparatus 101 makes an HTTP connection to the relay server 104 designate by the address obtained at reference numeral 307. At reference numeral 310, the image forming apparatus 101 makes a connection, by the relay server 104, with the PC 103 which is the counterparty designated by the obtained serial number, and 200 OK is returned from the relay server 104.

The image forming apparatus 101 then determines that the calling path with the PC 103 is a billing connection (a predetermined connection), and generates a call session in accordance with SIP via the HTTP tunnel generated by the foregoing reference numerals 305 to 306 and 309 to 310 in order to perform a call with the PC 103 by an HTTP media communication. This is illustrated by reference numeral 311. When the call session in accordance with the HTTP media communication is established, the image forming apparatus 101 subsequently transmits BYE at reference numeral 312 in order to switch from the billing connection call to the call in accordance with the HTTP media communication. Upon receiving 200 OK at reference numeral 313, the line for the billing connection is released.

Figure 4A:
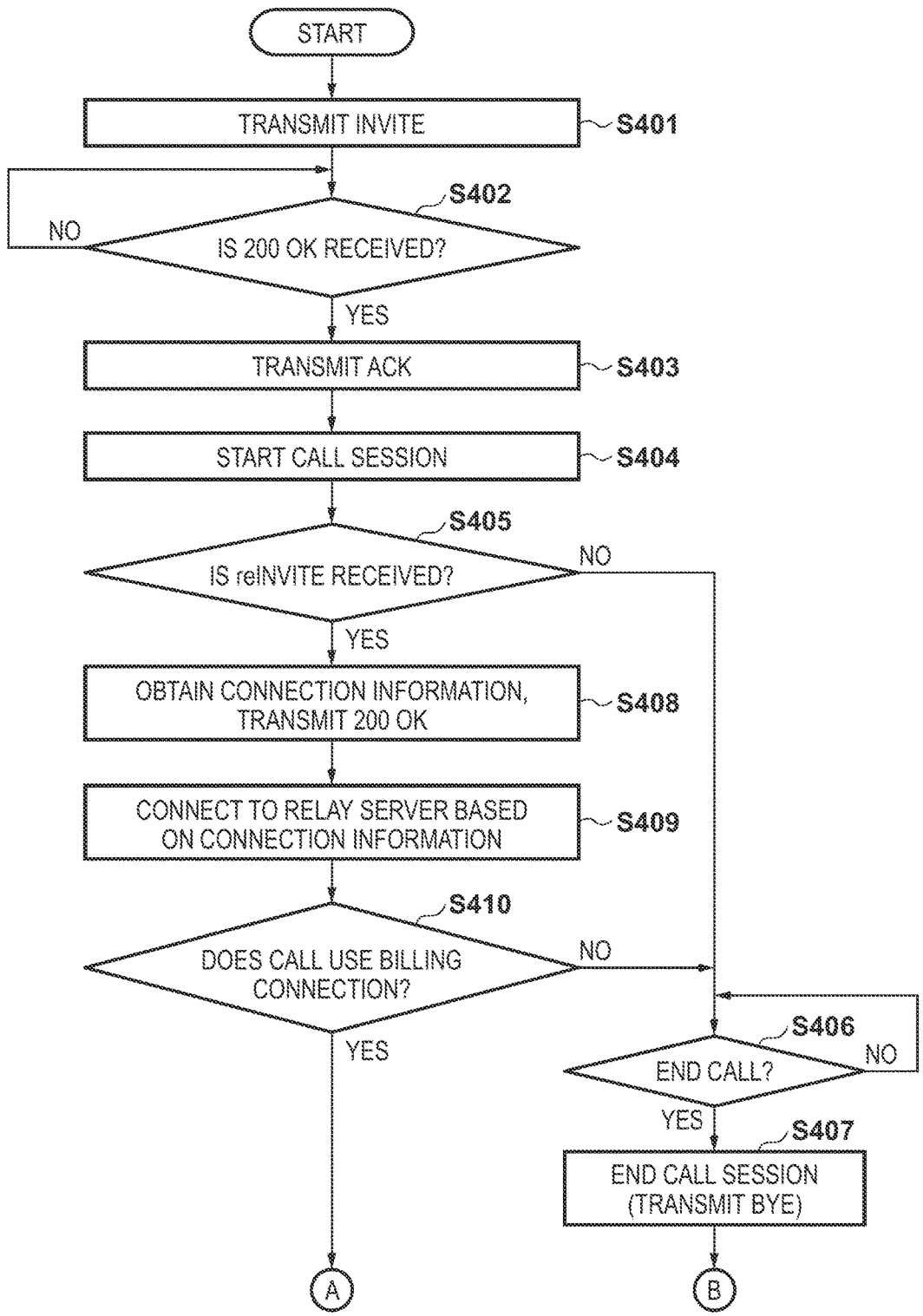
FIGS. 4A and 4B are flowcharts for describing processing for an image forming apparatus according to the embodiment to make an HTTP connection with the PC of the call center via the relay server.
Figure 4B:
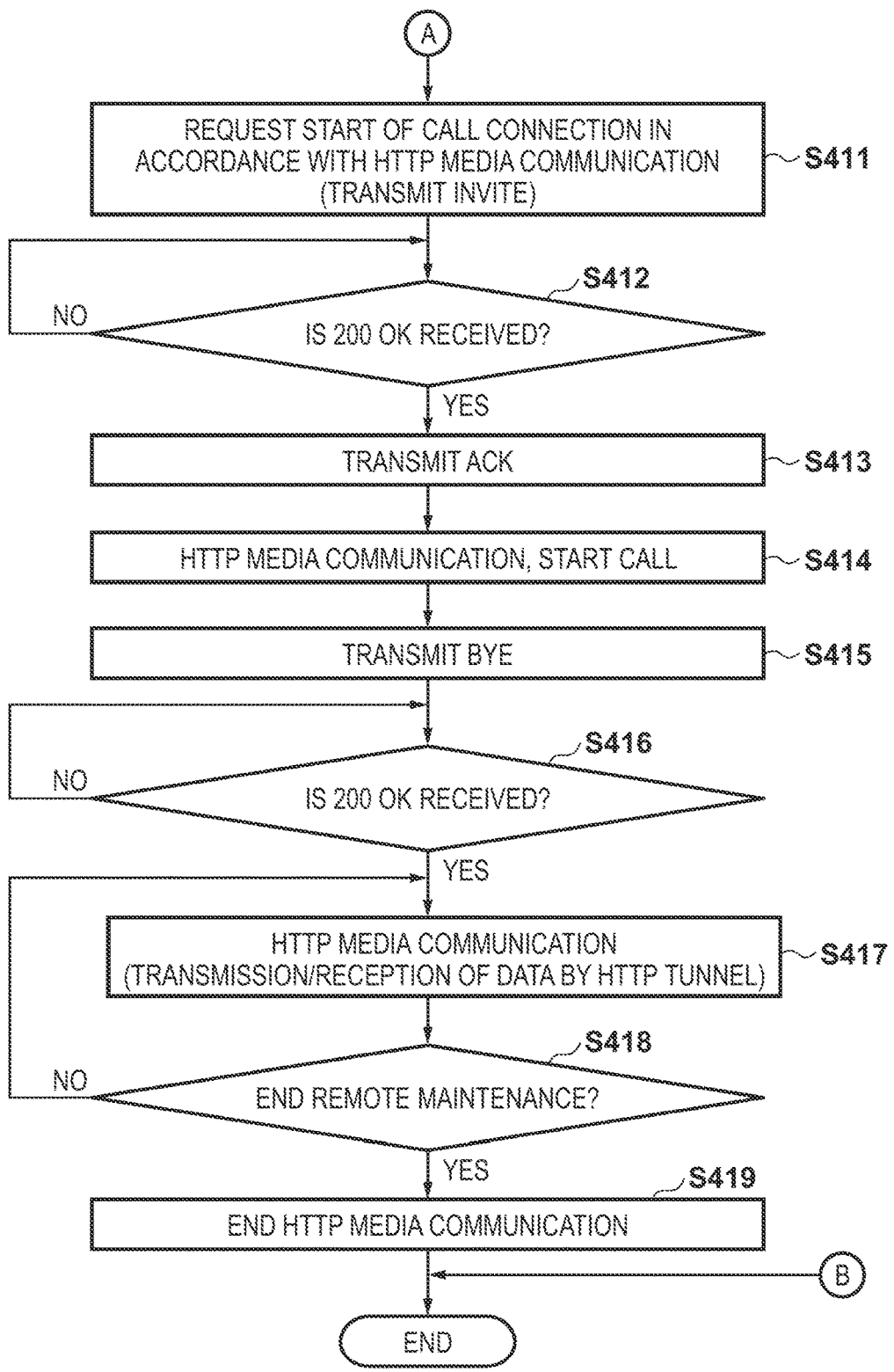

FIGS. 4A and 4B are flowcharts for describing processing for the image forming apparatus 101 according to the embodiment to make an HTTP connection with the PC 103 of the call center via the relay server 104. Note that this processing is achieved by the CPU 202 deploying a program stored in the HDD 205 into the RAM 204, and executing the deployed program.

This processing is started by the user 330 of the image forming apparatus 101 performing an outgoing call operation at the audio input/output device 214 which is a handset, a headset, or the like connected to the image forming apparatus 101, in order to make a query to the call center. Firstly, in step S401, the CPU 202 transmits an INVITE to the call center. Next, the processing proceeds to step S402, and the CPU 202 determines whether or not 200 OK which is an affirmative response with respect to the INVITE has been received, and when 200 OK is received, the processing proceeds to step S403 and an ACK is transmitted to the call center. Accordingly, the processing proceeds to step S404, and the CPU 202 starts a call session with the PC 103 of the call center to enable a call.

Next, the processing proceeds to step S405, and the CPU 202 determines whether or not a reINVITE that describes connection information, namely the address of the relay server 104 and a serial number, has been received. In the case where the reINVITE is not received and information for connecting to the relay server could not be obtained here, the processing proceeds to step S406, the connection to the line on which the call is being performed continues, and support by the call only is received. In step S406, the CPU 202 determines whether or not the support by the call only has ended, and upon determining that it has ended, the processing proceeds to step S407, and the CPU 202 transmits a BYE to end the call session.

Meanwhile, when the CPU 202 determines in step S405 that a reINVITE stating connection information, namely the address of the relay server 104 and the serial number, has been received, the processing proceeds to step S408, and the CPU 202 transmits 200 OK which is an affirmative response. Next the processing proceeds to step S409, and the CPU 202 automatically connects to the relay server 104 based on the connection information, without involving user input. Accordingly, remote maintenance is started via the HTTP media communication.

Next, the processing proceeds to step S410, and the CPU 202 determines whether the line connection on which the call is being performed is a billing connection or a connection that is not billed. Here, if the telephone number transmitted in step S401 is an external line telephone number that includes an area code, it is determined to be a billing connection that goes through the public telephone network 112. Meanwhile, in the case of a telephone number that includes an extension number or the like, it is determined to be a non-billing connection that does not go through the public telephone network 112. When the CPU 202 determines in step S410 that the call is a non-billing connection, the processing proceeds to step S406, and the call which is in accordance with an IP telephone call continues during the remote maintenance. Meanwhile, when it is determined that the call is a billing connection, the processing proceeds to step S411 (FIG. 4B), and the CPU 202 transmits an INVITE to the PC 103 via the relay server 104 in order to start a call in accordance with HTTP media communication via an HTTP tunnel. The processing proceeds to step S412, and the CPU 202 determines whether or not 200 OK is received from the PC 103, and when 200 OK is received the processing proceeds to step S413, and the CPU 202 transmits an ACK to the PC 103 via the relay server 104. The processing proceeds to step S414, and the CPU 202 starts a call session in accordance with HTTP media communication.

Next, the processing proceeds to step S415, and a BYE for releasing the circuit of the billing connection call for up until now is transmitted to the PC 103 at the same time as the start of the HTTP media session. In step S416, the CPU 202 determines whether or not 200 OK with respect to the BYE has been received from the PC 103, and when 200 OK is received, the processing proceeds to step S417, and the CPU 202 confirms the release of the call line for the billing connection. Processing for other media communication such as the call in accordance with the HTTP media communication, a still image or a moving image for the remote maintenance, or the like is performed. The processing proceeds to step S418, and the CPU 202 determines whether or not the remote maintenance has ended, and upon determining that it has ended, the processing proceeds to step S419, and the CPU 202 ends the HTTP media calling processing, and this processing ends.

In this manner, the user 330 of the image forming apparatus 101 enables remote maintenance by connecting to the PC 103 of the operator 331 of the call center via the relay server 104. In such a case, if a line connecting the user 330 of the image forming apparatus 101 and the operator 331 of the PC 103 is a line where a call charge occurs, it is possible to automatically switch to a call in accordance with HTTP media communication, and thus there is an effect in that it is possible to reduce the burden of a call charge for the user 330.

Figure 5A:
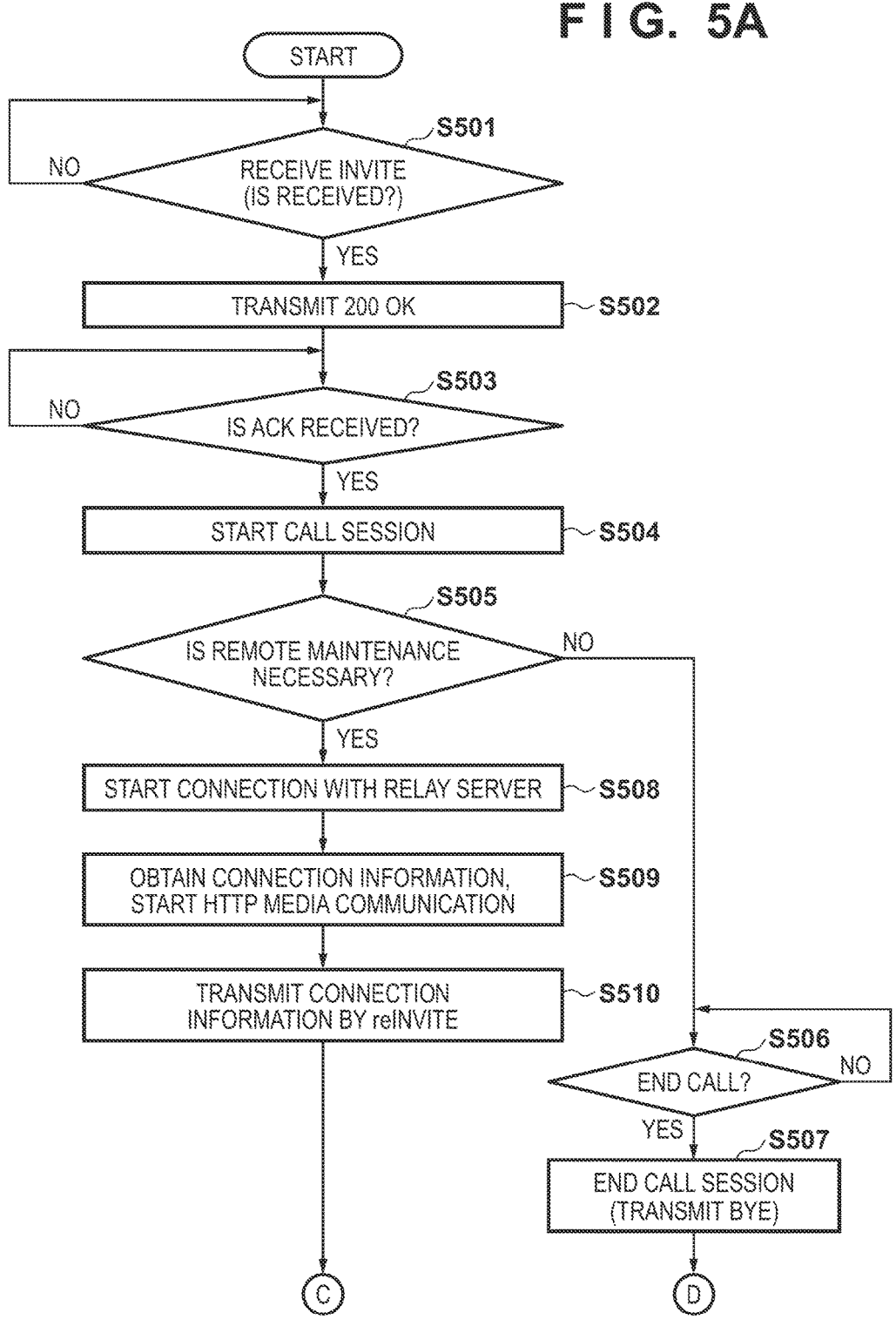

FIGS. 5A and 5B are flowcharts for describing processing for the PC 103 of the call center according to the embodiment to make an HTTP connection with the image forming apparatus 101 via the relay server 104. Note that this processing is achieved by the CPU 221 deploying a program stored in the HDD 224 into the RAM 223, and executing the deployed program. This processing is started in a state where an IP telephone application which is part of a remote maintenance system installed on the PC 103 of the call center is waiting for reception of a call from the user of the image forming apparatus 101.

Firstly, in step S501, the CPU 221 determines whether or not an INVITE has been received, and when an INVITE has been received, the processing proceeds to step S502, and the CPU 221 transmits 200 OK which is an affirmative response to the image forming apparatus 101 when a call is possible. Next, the processing proceeds to step S503, and the CPU 221 determines whether or not an ACK with respect to the 200 OK has been received from the image forming apparatus 101, and when an ACK is received, the processing proceeds to step S504, and a call state is entered by a call session being generated with the image forming apparatus 101.

The operator 331 of the call center determines whether or not remote maintenance is necessary based on information elicited from the user 330 of the image forming apparatus 101, and inputs the necessity of remote maintenance by the keyboard 231 or the like. In step S505, the CPU 221 is inputted with the necessity of remote maintenance by the operator 331, and determines whether or not the remote maintenance is necessary. When the CPU 221 determines that the remote maintenance is not necessary, the processing proceeds to step S506, and support is performed by the call only. In step S506, it is determined whether or not the support by the call has ended, and when it is determined that the call has ended, the processing proceeds to step S507, and the CPU 221 transmits a BYE to perform processing to end the call session, and this processing ends.

Meanwhile, when the CPU 221 determines in step S505 that the remote maintenance is necessary, the processing proceeds to step S508, and a connection is made to the relay server 104. The processing then proceeds to step S509, and the CPU 221 obtains from the relay server 104 the address of the relay server 104 and the serial number as the connection information for performing HTTP media communication with the image forming apparatus 101, and starts HTTP media communication with the PC 103 and the relay server 104.

Next, the processing proceeds to step S510, and the CPU 221 transmits the obtained serial number and the address of the relay server 104 which is connection information to the image forming apparatus 101 by a reINVITE from an IP telephone application that is in a call state. Next, the processing proceeds to step S511 (FIG. 5B), and the CPU 221 determines whether or not an INVITE which is a connection request for a call session in accordance with HTTP media communication has been received. When an INVITE is received and a call becomes possible here, the processing proceeds to step S512, and the CPU 221 transmits 200 OK which is an affirmative response. Next, the processing proceeds to step S513, and the CPU 221 determines whether or not an ACK with respect to the 200 OK has been received, and when an ACK is received, the processing proceeds to step S514. In step S514, and the CPU 221 starts a call in accordance with HTTP media communication. Next, the processing proceeds to step S515, and the CPU 221 determines whether or not a BYE for releasing the circuit of the billing connection call for up until now has been received at the same time as the start of the call of the HTTP media session. When it is determined that a BYE has been received here, the processing proceeds to step S516, and the CPU 221 transmits 200 OK with respect to the BYE to the image forming apparatus 101, and releases the call line for the billing connection. The processing proceeds to step S517, and the CPU 221 performs processing for other media communication such as the call in accordance with the HTTP media communication, a still image or a moving image for the remote maintenance, or the like. In step S518, the CPU 221 determines whether or not the remote maintenance has ended, and when it is determined that the remote maintenance has ended, the processing proceeds to step S519, and the HTTP media calling processing ends, and this processing ends.

By virtue of the embodiment as described above, when performing remote maintenance between an image forming apparatus and an information processing apparatus in a call center, it is possible to reduce a burden for switching communication lines. In addition, in a case where a call for making a query from the image forming apparatus to the call center is a billing connection, by releasing the billing connection and switching to a call in accordance with an HTTP media communication means, it is possible to reduce the burden of a call charge for a user of the image forming apparatus.

In addition, when calling the call center by telephone from the image forming apparatus 101 for which an error has occurred, the image forming apparatus 101 makes a notification of the error information by SIP. Accordingly, the PC 103 of the call center displays the error information, and when the PC 103 determines that the error information is an error for which the necessity of remote maintenance is high, the PC 103 may perform a display prompting an operator of the PC 103 to perform the remote maintenance.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-035110, filed Feb. 27, 2017, which is hereby incorporated by reference herein in its entirety.

What is claimed is:

1. An information processing system in which an image forming apparatus and an information processing apparatus are connected, and in which remote support of the image forming apparatus is performed from the information processing apparatus,
   wherein the image forming apparatus comprises:
   a first memory device that stores a set of instructions; and
   at least one first processor that executes the instructions to:
      connect to a telephone network and make a call to the information processing apparatus,
      determine whether or not the call is by a predetermined connection, and
      switch communication with the information processing apparatus to a call in accordance with HTTP media, in accordance with having determined that the call is by the predetermined connection, and
   wherein the information processing apparatus comprises:
   a second memory device that stores a set of instructions; and
   at least one second processor that executes the instructions to:
      connect to the telephone network and make a call to the image forming apparatus, and
      perform a call in accordance with HTTP media with the image forming apparatus.

2. The information processing system according to claim 1, wherein the image forming apparatus connects to the information processing apparatus via a relay server, and wherein the at least one first processor executes the instructions further to:
set an HTTP tunnel between the information forming apparatus and the relay server, and
perform media communication with the information processing apparatus via the HTTP tunnel.

3. The information processing system according to claim 1, wherein the information processing apparatus connects to the image forming apparatus via a relay server, and
wherein the at least one second processor executes the instructions further to:
set an HTTP tunnel between the information processing apparatus and the relay server, and
perform media communication with the image forming apparatus via the HTTP tunnel.

4. The information processing system according to claim 1, wherein the predetermined connection is a billing connection, and
wherein the at least one first processor determines whether or not the call is a billing connection based on a telephone number of a counterparty of the call or a URI of the counterparty.

5. The information processing system according to claim 4, wherein the at least one first processor determines that the call is the billing connection if a telephone number of the counterparty includes an area code.

6. The information processing system according to claim 2, wherein the at least one first processor switches communication with the information processing apparatus to a call in accordance with HTTP media via the relay server, based on connection information and an address of the relay server received from the information processing apparatus.

7. The information processing system according to claim 1, wherein the call between the image forming apparatus and the information processing apparatus is a call in accordance with SIP (Session Initiation Protocol).

8. An image forming apparatus capable of performing remote support from an information processing apparatus,
a memory device that stores a set of instructions; and
at least one processor that executes the instructions to:
connect to a telephone network and make a call to the information processing apparatus,
determine whether or not the call is by a predetermined connection, and
switch communication with the information processing apparatus to a call in accordance with HTTP media, in accordance with having determined that the call is by the predetermined connection.

9. The image forming apparatus according to claim 8, wherein the image forming apparatus connects to the information processing apparatus via a relay server, and
wherein the at least one processor executes the instructions to:
set an HTTP tunnel between the image forming apparatus and the relay server, and
perform media communication with the information processing apparatus via the HTTP tunnel.

10. The image forming apparatus according to claim 8, wherein the predetermined connection is a billing connection, and
wherein the at least one first processor determines whether or not the call is the billing connection based on a telephone number of a counterparty of the call or a URI of the counterparty.

11. A method of controlling an image forming apparatus capable of performing remote support from an information processing apparatus, the method comprising:
connecting to a telephone network and making a call to the information processing apparatus;
determining whether or not the call is by a predetermined connection, and
switching communication with the information processing apparatus to a call in accordance with HTTP media, in accordance with having determined that the call is by the predetermined connection.

12. A non-transitory computer-readable storage medium storing a program for causing a processor to execute a method of controlling an image forming apparatus capable of performing remote support from an information processing apparatus, the method comprising:
connecting to a telephone network and making a call to the information processing apparatus;
determining whether or not the call is by a predetermined connection, and
switching communication with the information processing apparatus to a call in accordance with HTTP media, in accordance with having determined that the call is by the predetermined connection.

* * * * *